R. HARRISON.
Watering-Dipper.

No. 217,371.  Patented July 8, 1879.

Attest:
C. Clarence Poole
Warren Seely

Inventor:
Regina Harrison
by Ellis Spear
Atty.

N. PETERS, PHOTO-LITHOGRAPHER, WASHINGTON, D. C.

UNITED STATES PATENT OFFICE.

REGINA HARRISON, OF COLUMBUS, MISSISSIPPI.

IMPROVEMENT IN WATERING-DIPPERS.

Specification forming part of Letters Patent No. 217,371, dated July 8, 1879; application filed May 28, 1879.

*To all whom it may concern:*

Be it known that I, REGINA HARRISON, of Columbus, in the county of Lowndes and State of Mississippi, have invented a new and useful Improvement in Watering-Dippers; and I hereby declare that the following is a full, clear, and exact description of the same.

My invention has for its object to provide a convenient apparatus for watering plants and for like purposes, by means of which the labor is greatly lessened and the water applied at any desired point within reach.

Heretofore devices of this class have been made in the shape of an ordinary bucket, partially covered, and provided with a spout having a perforated disk for subdividing the stream of water, and also provided with a bail, by which it could be carried, and a handle for the purpose of tipping it, in order to cause the flow of water.

The inconvenience of this old form is well known to those accustomed to use it for sprinkling plants, and like purposes. When any considerable amount of water is carried in such bucket or pail, it is laborious to carry and difficult to tip and hold so as to cause the water to flow properly upon the plants to be watered. Such watering-pails are provided with a bail and side handle, and must ordinarily be filled by pouring from another vessel.

My invention consists of a watering device made in the form of a dipper, with a single handle instead of a bail, and with the nozzle so arranged that the user may dip the water from a pail or other vessel and reach to the object to be watered.

Figure 1:
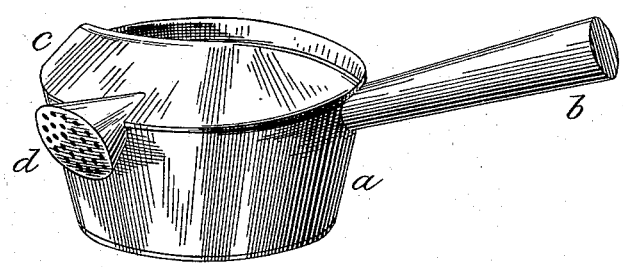
Figure 2:
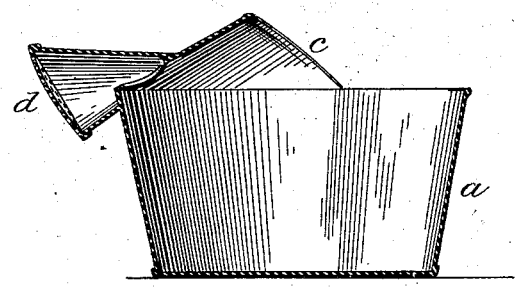

In the drawings hereunto attached, Figure 1 is a perspective view of the apparatus. Fig. 2 represents a section across the center of the dipper and of the spout.

In these figures, *a* represents the body of the dipper, and *b* the handle, which may be of any convenient length.

The body of the dipper is partially covered by the shield *c*, at the center of which is fixed the spout *d*. This spout is located a little more than one-quarter of the circumference from the handle *b*, in order to bring it at a convenient point for the outflow of the water when the dipper is held in an inclined position, as it is adapted to be by the construction of the handle. It is made flaring and provided with a perforated disk, through which the water flows in finely-divided streams in the same manner as with ordinary watering-pots.

The shield should be made to extend a little more than one-half the distance around the edge of the body of the dipper, leaving an opening of sufficient size to allow the water to be readily dipped, and at the same time holding the water against overflow while the dipper is tipped to cause the water to flow from the nozzle.

This dipper is obviously adapted to be used with a bucket or any larger vessel of water, which may be brought by an attendant, and the water dipped in small quantities from such a vessel, and readily and easily applied.

The length of the handle and the size of the dipper permit the use of the apparatus without the inconvenience of stooping, and facilitate the watering of plants without requiring the user to approach as near as is necessary when using the ordinary watering-pot. It may be conveniently used with one hand, and renders the task of watering ornamental plants and the like easy and agreeable.

I am well aware that the form of the shield and nozzle, as well as that of the dipper and handle, are old; but

What I claim, and desire to secure by Letters Patent, is—

The described watering-dipper, consisting of the body *a*, the handle *b*, the shield *c*, and the nozzle *d*, with its perforated disk, the parts being constructed and arranged as and for the purpose set forth.

REGINA HARRISON.

Witnesses:
 R. L. LEE,
 M. B. HARRISON.